(No Model.) 2 Sheets—Sheet 2.
J. A. HURLEY.
LEMON SQUEEZER.
No. 375,323. Patented Dec. 20, 1887.
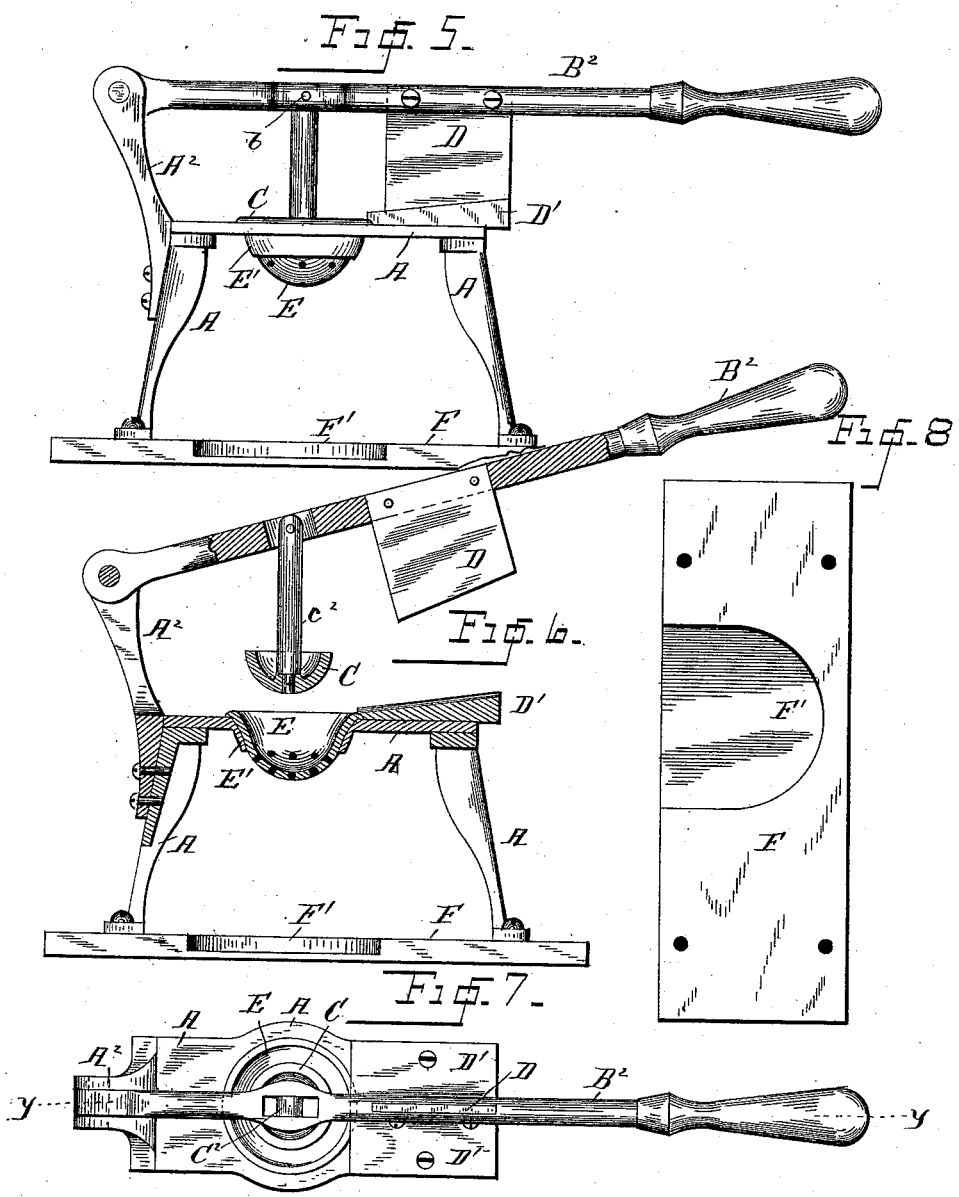
Witnesses
Wm H. Courtland
Chas. P. Lechner
Inventor
John A. Hurley
Wm Hallock & Halleck
attys

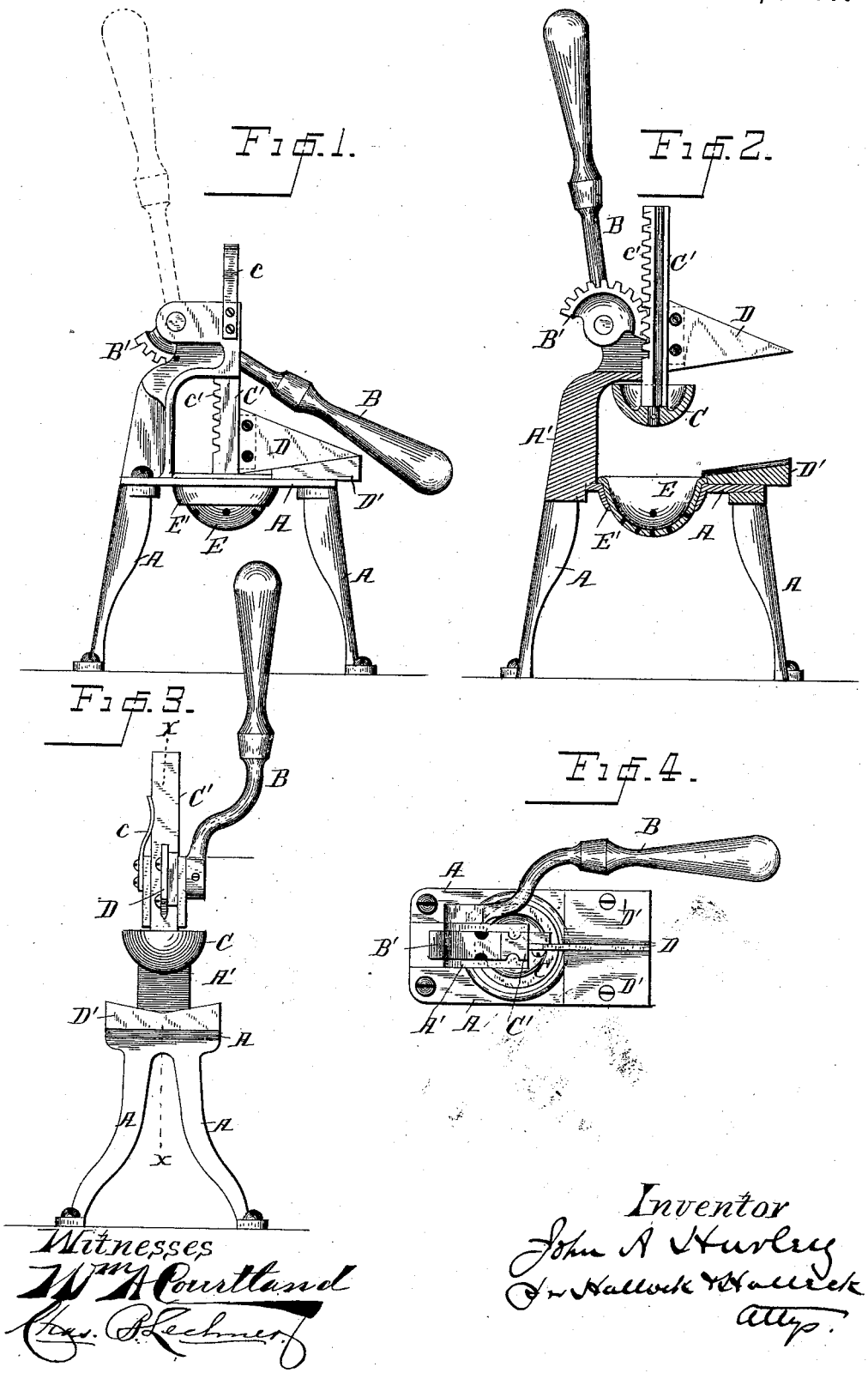

UNITED STATES PATENT OFFICE.

JOHN A. HURLEY, OF ERIE, PENNSYLVANIA.

LEMON-SQUEEZER.

SPECIFICATION forming part of Letters Patent No. 375,323, dated December 20, 1887.

Application filed August 27, 1887. Serial No. 248,051. (No model.)

*To all whom it may concern:*

Be it known that I, JOHN A. HURLEY, a citizen of the United States, residing at Erie, in the county of Erie and State of Pennsylvania, have invented certain new and useful Improvements in Lemon-Squeezers; and I do hereby declare the following to be a full, clear, and exact description of the invention, such as will enable others skilled in the art to which it appertains to make and use the same.

This invention relates to devices for cutting and squeezing lemons; and it consists in certain improvements in the construction thereof, as will be hereinafter fully set forth, and pointed out in the claims.

My invention is illustrated in the accompanying drawings, as follows:

Figure 1 is a side elevation. Fig. 2 is a vertical longitudinal section on the line $x\ x$ in Fig. 3, with the knife and plunger in elevation. Fig. 3 is a front elevation. Fig. 4 is a top or plan view. Fig. 5 is a side elevation of an alternative construction. Fig. 6 is a longitudinal vertical section of the construction shown in Fig. 5 on the line $y\ y$ in Fig. 7. Fig. 7 is a top or plan view of the same construction. Fig. 8 is a top view of the base-board F, seen in Figs. 5 and 6.

The primary object of my invention is to combine a lemon squeezer and cutter in the same apparatus. In both the constructions here shown this is accomplished. There are other and minor features of construction, which will be pointed out in the following general description of the construction and operation of the device.

A A A is a frame-work or stand. In the construction shown in Figs. 1, 2, 3, and 4 there is a head, A', mounted on said frame or stand, in which is guided a vertically-movable plunger, C', which carries a presser, C, on its lower end. This plunger has a rack, $c'$, on its rear side, which meshes with a pinion, B', which is journaled in said head. A lever, B, is attached to the shaft or journal of said pinion, and a movement of this lever will raise or lower the plunger. Connected with the said plunger C' is a knife, D, and on the stand below the knife is a cutting-board, D', which is made inclining toward the middle of the stand and from each side to the point where the knife impinges upon it. In the center of the stand, directly below the plunger C', is a perforated cup, E, which sets in a flanged opening, E'. This makes the cup removable, so that it can be cleaned easily; but, if desired, the cup may be integral with the top of the stand.

The operation of this device will be as follows: The operator will lay a lemon on the cutting-board D' in such a position that the knife D when it is brought down will cut the lemon in two crosswise. The operator will then raise the lever again and place one of the parts of the lemon in the cup E, with its cut face down, and will then depress the lever and bring the presser C down upon the lemon and compress it tightly in the cup. The juice of the lemon will flow through the holes in the cup into a tumbler or other receptacle, which will be placed underneath the cup.

The object in having the cutting-board inclined, as stated, is to catch any juice that may be expressed from the lemon while cutting it and carry it into the cup.

On the upper part of the head A' there may be a spring, $c'$, as shown in Figs. 1 and 3, to press against the plunger C' for the purpose of binding or holding it, so that it will not drop down of its own accord.

In the construction shown in Figs. 5, 6, and 7 there is no plunger C' guided in head A'. In place of this a fulcrum block or head, A², extends up from the stand, and a lever, B², is fulcrumed on this block or head, and the presser C is hung to this lever by a stem, $c^2$, and the knife D is fastened directly to the lever B². In each of these forms it will be seen that the knife and presser are operated by the same lever. In one case the lever moves a plunger by interposed gearing, to which the said presser and cutter are attached, and in the other case the presser and cutter are both attached directly to the lever.

I mount my machine on a base-board, F, in which there is cut a semicircular opening, F', which is directly below the cup E in which the lemon is squeezed. This opening F' may be cut entirely through the board F, or be countersunk into it, as shown in Figs. 5, 6, and 8. The object of the opening is to act as a gage to enable the operator to always set a tumbler directly below the cup E without looking to see if it is properly adjusted in place.

What I claim as new is—

1. In a lemon-squeezer, the combination of a fulcrum block or head, a cutting-board and a perforated cup in which the lemon is to be compressed, a cutter operating upon said cutting-board, a presser operating within said cup, and an operating-lever fulcrumed in said block or head which operates both the cutter and the presser, substantially as set forth.

2. In a lemon-squeezer, the combination of a perforated cup in which the lemon is to be compressed, a cutting-board and a fulcrumed block or head, a plunger guided in said head which carries a presser to operate in said cup, and a cutter to operate upon said cutting-board, and a lever which operates said plunger, substantially as set forth.

3. In a lemon-squeezer, the combination of a fulcrum block or head, a plunger guided in said head and having a rack-gear thereon, a pinion meshing with said rack which is journaled in said head, a lever for operating said pinion, a presser and a cutter attached to said plunger, and a cup and a cutting-board arranged below said plunger, substantially as set forth.

4. In a lemon-squeezer, the combination of a perforated cup to receive the lemon to be compressed, a cutting-board placed contiguous to and draining into said cup, a cutter operating upon said board, a presser operating upon said cup, and a lever operating both the presser and the cutter, substantially as set forth.

In testimony whereof I affix my signature in presence of two witnesses.

JOHN A. HURLEY.

Witnesses:
JNO. K. HALLOCK,
WM. A. COURTLAND.